United States Patent
Schmitt et al.

(10) Patent No.: US 9,932,245 B2
(45) Date of Patent: Apr. 3, 2018

(54) UV SANITIZING ASSEMBLIES WITH HIGH DOSE FEATURES AND METHODS FOR CONTROLLING THE SAME

(71) Applicant: Watts Regulator Co., North Andover, MA (US)

(72) Inventors: Craig Schmitt, North Andover, MA (US); Michael Sarchese, North Andover, MA (US); Colin Powell, North Andover, MA (US)

(73) Assignee: Watts Regulator Co., North Andover, MA (US)

( * ) Notice: Subject to any disclaimer, the term of this patent is extended or adjusted under 35 U.S.C. 154(b) by 0 days.

(21) Appl. No.: 14/807,184

(22) Filed: Jul. 23, 2015

(65) Prior Publication Data

US 2016/0023924 A1     Jan. 28, 2016

Related U.S. Application Data

(60) Provisional application No. 62/027,993, filed on Jul. 23, 2014.

(51) Int. Cl.
*C02F 1/32*     (2006.01)

(52) U.S. Cl.
CPC ........ *C02F 1/325* (2013.01); *C02F 2201/326* (2013.01); *C02F 2201/3223* (2013.01); *C02F 2209/006* (2013.01); *C02F 2209/02* (2013.01); *C02F 2209/40* (2013.01)

(58) Field of Classification Search
USPC .......................... 250/436, 435, 432 R, 455.11
See application file for complete search history.

(56) References Cited

U.S. PATENT DOCUMENTS

| D140,141 | S | 1/1945 | Glatthar et al. |
| 3,683,177 | A * | 8/1972 | Veloz .......................... A61L 2/10 119/245 |
| 4,017,734 | A * | 4/1977 | Ross .......................... A61L 2/10 250/431 |
| 4,700,101 | A | 10/1987 | Ellner et al. |

(Continued)

FOREIGN PATENT DOCUMENTS

WO     WO-2000068152 A1     11/2000

OTHER PUBLICATIONS

European Search Report from EP Application No. 16275056.6 dated Jan. 20, 2017, 6 pages.

*Primary Examiner* — Kiet T Nguyen
(74) *Attorney, Agent, or Firm* — Burns & Levinson, LLP; George N. Chaclas

(57) ABSTRACT

A purifying system for treating a fluid with UV light including a housing defining: a chamber having a treatment zone; an inlet; and an outlet. The light source supplies UV light to the treatment zone. The inlet, the tubular housing, or the outlet may extend inward into the chamber so that the fluid passes close to the light source and has a relatively increased duration in the treatment zone. The purifying system may also have a sensor coupled to the housing or light source for generating a first signal indicative of a first parameter of the treatment zone. A microcontroller can control the light source based on a signal from the sensor and data characterizing the light source. The microcontroller may also vary operation of the light source and collect data to create the data characterizing the light source.

14 Claims, 4 Drawing Sheets

(56) References Cited

U.S. PATENT DOCUMENTS

| | | | |
|---|---|---|---|
| 5,334,905 A | | 8/1994 | Ullrich |
| 5,393,419 A | | 2/1995 | Tiede et al. |
| 5,547,590 A | * | 8/1996 | Szabo .................... B01J 19/123 |
| | | | 210/103 |
| 6,960,321 B1 | * | 11/2005 | Ludwig .................... A61L 2/07 |
| | | | 134/18 |
| D598,578 S | | 8/2009 | Hanley |
| D598,579 S | | 8/2009 | Hanley |
| 7,569,981 B1 | | 8/2009 | Ciancanelli |
| 8,395,134 B2 | | 3/2013 | Penhale et al. |
| 8,674,322 B2 | | 3/2014 | Kohler |
| 8,890,087 B2 | | 11/2014 | Ben-David et al. |
| 2004/0061069 A1 | * | 4/2004 | Schaible .................. A61L 2/10 |
| | | | 250/432 R |
| 2009/0261264 A1 | * | 10/2009 | Hormann ................ C02F 1/325 |
| | | | 250/373 |
| 2010/0296971 A1 | * | 11/2010 | Gaska ...................... A61L 2/10 |
| | | | 422/62 |
| 2011/0278467 A1 | * | 11/2011 | Tanaka .................... C02F 1/325 |
| | | | 250/372 |
| 2014/0077696 A1 | | 3/2014 | Kuennen et al. |
| 2014/0158905 A1 | | 6/2014 | Hoang |
| 2014/0166590 A1 | * | 6/2014 | Rozenberg ............. C02F 1/008 |
| | | | 210/746 |
| 2014/0202962 A1 | * | 7/2014 | Bilenko .................. C02F 1/325 |
| | | | 210/748.11 |

\* cited by examiner

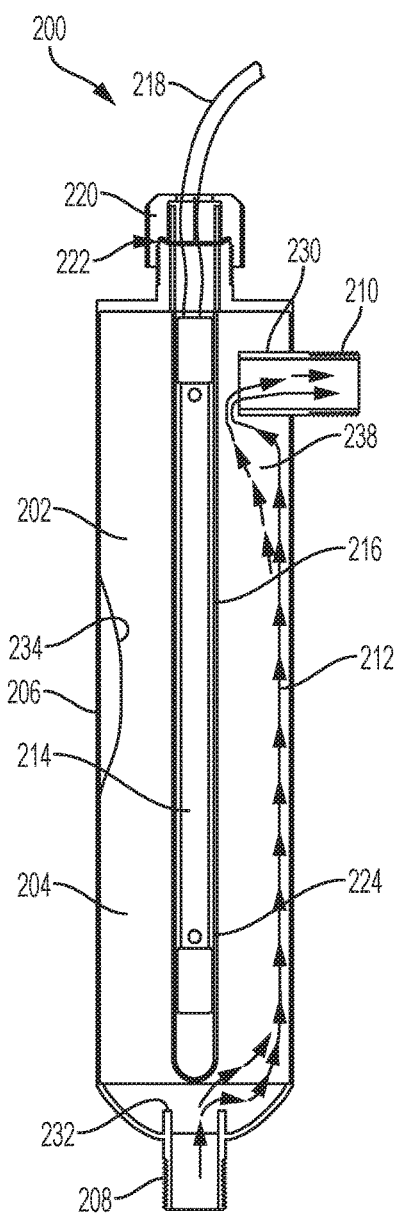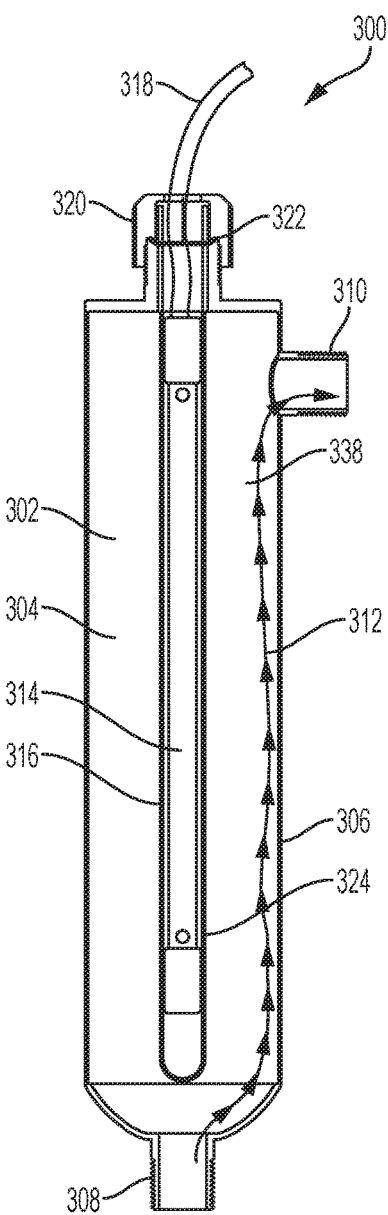
FIG. 5
FIG. 6
PRIOR ART

UV SANITIZING ASSEMBLIES WITH HIGH DOSE FEATURES AND METHODS FOR CONTROLLING THE SAME

CROSS-REFERENCE TO RELATED APPLICATION

This application claims priority to U.S. Provisional Patent Application No. 62/027,993, filed Jul. 23, 2014 and U.S. Provisional Patent Application No. 62/150,827, filed Apr. 21, 2015, which are incorporated herein by reference.

BACKGROUND OF THE DISCLOSURE

1. Field of the Disclosure

The subject disclosure relates to assemblies and methods for sanitizing fluid such as water using UV light and, more particularly to extended UV sanitizing chamber ports that improve dosage as well as systems and methods for characterizing the sanitizing assemblies to improve operational efficiency.

2. Background of the Related Art

Generally, treatment of fluids via irradiation with ultraviolet light is known. The treatment of fluids, including disinfection of water, within an enclosed treatment zone that is irradiated with ultraviolet light (hereafter abbreviated to "UV" or UV light") is shown in FIG. 6, which is a cross-sectional view of a system as described below. The objective of these systems, as for any type of photo-reactor, is to provide a uniform amount of UV energy to each individual element (e.g., contaminant molecule, microorganism) as the fluid passes through the treatment zone.

Typically the UV energy accumulated by an individual element while passing through the treatment zone is a product of the UV intensity multiplied by time of exposure and can be referred to as "UV dose" for that particular element. In practice, the elements flowing through the UV treatment zone will follow different paths, with these paths having different exposure times and flowing through areas of the treatment zone having different UV intensity. Thus, the end result is that the individual elements will accumulate different amounts of UV dose. In the case of UV disinfection reactors, the net efficacy is limited by the elements accumulating relatively low UV dose.

Still referring to FIG. 6, a typical prior-art UV treatment vessel 300 is shown in cross-section. In the vessel 300, a UV treatment zone 302 is defined within an interior chamber 304 of a housing 306. The housing 306 is fluid-tight except for an inlet port 308 and an outlet port 310. Fluid flowing through the chamber 304 is represented by flow arrows 312. At least one UV light emitting source 314 is located within chamber 304 to provide radiant UV energy within the treatment zone 302.

Many forms of UV emitting source assemblies 314 are available, including those utilizing mercury vapour lamps or UV light emitting diodes. The UV source 314 may be housed within a UV transparent sleeve 316. The UV source 314 receives electrical energy via wires 318 from an electrical power supply along with a microcontroller (not shown). The power supply and microcontroller are designed to suit the specific type of UV emitter 314.

A sealing cap 320 with an o-ring seal 322 seals the transparent sleeve 316 to the housing 306, allowing a passageway for the UV source 314 and wires 318 while preventing undesirable escape of fluid. The sleeve 316 may be physically stabilized by one or more mechanical supports (not shown) located along a length thereof. The supports are most commonly at the distal end 324 most distant from sealing cap 320.

The flowpath or fluid streamline as demonstrated by the arrows 312 has been analyzed using computational fluid dynamics and numerical methods for modeling dose accumulation for individual fluid elements. As a result, it is known that certain fluid elements take a more rapid transfer through the treatment zone 312. For example, fluid elements following the streamlined flowpath of arrows 312 will have a relatively shorter duration of exposure time. Additionally, these fluid elements experience a relatively low radiant intensity due to farther distance from UV source 314. In short, certain fluid elements such as the ones along arrows 312 are poorly dosed. It is also appreciated that the fluid will have a higher velocity in the region 338 near the outlet port 310.

Further, the UV source is often a low pressure (LP) or low-pressure high output (LPHO) mercury vapour lamp that relies on liquid mercury droplets within the lamp envelope to regulate mercury vapour pressure during lamp operation. The UV light output efficiency of such lamps is strongly dependent on the pressure of the mercury vapour inside the lamp.

Devices utilizing UV outputs of mercury vapour lamps are well known. More particularly, mercury vapour lamps emitting ultraviolet light in the UVC wavelength regions near 254 nm and 185 nm are well known in fluid treatment applications. The characteristic wavelength outputs are commonly used to provide germicidal, oxidizing, and other beneficial effects. Often there are single-lamp point-of-use water treatment systems as well as multi-lamp systems for larger flow-rates.

It is apparent that the overall efficacy of the fluid treatment system benefits from having efficient production of UVC light from electrical energy input to the UV lamp. Although the family of LP and LPHO lamps represents one of the most economical means of producing germicidal light, it suffers from loss of output efficiency if the liquid micro-droplets are either below or above the temperature required for optimum germicidal light output. Since these UV systems must typically treat fluids across a range of temperatures, the lamp ballast/controller must be able to provide sufficient energy to ensure UVC output for fluid at the low end of the temperature range.

Unfortunately, with conventional ballasts supplying constant are current, the high energy required for cold operation results in the lamp(s) operating in an overheated condition when fluid is at higher temperatures, and in cases where the fluid is stagnant the UV lamp causes undesirable additional heating of the fluid. In practice, it is problematic to match a particular lamp and driving current to satisfy fluid treatment applications across a range of fluid temperatures. Thus, the lamp UVC efficiency can be reduced to less than half of the peak just from overcooling or overheating of the lamp.

SUMMARY OF THE INVENTION

In view of the above, it can be appreciated that it is beneficial to be able to adjust the power level of the lamp in response to the demand of the fluid treatment system. In other words, dimming the lamp when the system demand requires less UVC energy would improve efficiency. Dimming control based on simple on/off flow detection (e.g., by means of a pressure switch) and also by a more sophisticated technique that includes use of water temperature is described in U.S. Pat. No. 5,547,590 issued on Aug. 20, 2996.

Unfortunately, the extreme temperature dependence of these mercury vapour lamps interferes with matching the power level to the system demand. For example, if the lamp is already in an overheated condition then increasing the lamp arc current will cause further overheating and may actually result in less UV output. However, simply reducing lamp arc current may result in overcooling of the lamp.

The subject technology addresses and overcomes these concerns. In one embodiment, the subject technology is directed to improving the stability of output efficiency of a mercury vapour UV lamp over a range of operating temperatures and input power levels. Additionally, the subject technology can control the electrical energy input to a mercury vapour UV lamp in a manner to improve the stability of the UV light output efficiency over a range of operating temperatures and input power levels.

The subject technology can operate a lamp closer to or even at its optimum UVC output efficiency for a particular power level. In one embodiment, the lamp ballast/controller either increase or decrease the electrical energy input to the lamp in response to at least one sensor input to optimize the UV output for a particular power setting. The at least one sensor input may be, but not limited to, one or more of the following: temperature of the fluid in the treatment zone; temperature of the lamp; UVC sensor signal; flow sensor, lamp arc current; lamp voltage; and time. Further, the controller may vary the UV output based upon characterization data for the UV assembly. For example, the magnitude or rate of change and response time across a range of operation may be predetermined and subsequently used to modify operation for efficient and/or optimum performance. The characterization of the lamp may be determined empirically by varying one or more parameters across a typical operation range and collecting data. Still further, the subject technology may employ Proportional Integral Derivative (PID) control loops and fuzzy logic control loops for further performance optimization.

Further, a plurality of sensor inputs may be used to develop a refined algorithm that can function effectively with a reduced number of sensor inputs. For example, UV output, fluid temperature, and time data may be analyzed to the extent that only time and fluid temperature are required to achieve near optimum lamp operation across a range of power settings. Still further, another embodiment monitors the temperature of the liquid mercury droplets more directly. For example, the monitoring is done by using an infra-red sensor, which creates more precisely control of the lamp near optimum lamp operation across a range of power settings.

One embodiment of the subject technology is directed to a fluid purifying system including a light source assembly. The light source assembly includes an elongated tubular housing defining: a chamber having a treatment zone; an inlet; and an outlet so that the fluid entering the inlet passes through the treatment zone and exits through the outlet. The light source assembly also includes a light source mounted in the chamber for supplying UV light to the treatment zone and a first sensor for generating a first signal indicative of a first parameter of the treatment zone. A microcontroller receives the first signal and controls operation of the light source. The microcontroller includes memory storing an instruction set and first data related to characterization of the light source assembly, and a processor for running the instruction set. The processor is in communication with the memory, wherein the processor is operative to control the light source based on the first signal and the first data.

In another embodiment, the processor is further operative to vary operation of the light source and collect data to create the first data related to characterization. The first data may include magnitude of change in UV output across a range of powers and corresponding response times. The first parameter may be selected from the group consisting of: a temperature of the fluid in the treatment zone; a temperature of the light source; a UV output; a flow of the fluid in the treatment zone; a light source are current; a light source voltage; and a light source response time. The first sensor may also monitor a temperature of liquid mercury droplets in the light source such as a mercury are lamp.

Additionally, as noted above, there are also problems associated with the vessels for UV treatment methods in that dosage is not very efficient, which results in certain fluid elements having improper dosage due to relatively quicker transit through the system and further distance from the UV source. The present technology provides low-cost features that reduce at least one phenomenon that leads to low-dose elements exiting the treatment zone.

Still another embodiment of the subject technology is directed to a vessel for treating a fluid with UV light comprising an elongated tubular housing defining a chamber having a treatment zone; an inlet; ad an outlet so that the fluid entering the inlet passes through the treatment zone and exits through the outlet, and a light source mounted in the chamber for supplying UV light to the treatment zone, wherein at least one of the inlet, the tubular housing, or the outlet extends radially inward into the chamber. At least one of the inlet, the tubular housing, or the outlet may extend radially inward adjacent the light source so that the fluid passes close to the light source in order to egress from the outlet. At least one of the inlet, the tubular housing, or the outlet may extend radially inward so that the fluid has a relatively increased duration in the treatment zone before egress from the outlet.

Still another embodiment of the subject technology combines the elements above into a single system. For example, the subject technology includes a purifying system for treating a fluid with UV light comprising: an elongated tubular housing defining: a chamber having a treatment zone; an inlet; and an outlet so that the fluid entering the inlet passes through the treatment zone and exits through the outlet. A light source mounts in the chamber for supplying UV light to the treatment zone. At least one of the inlet, the tubular housing, or the outlet extends radially inward into the chamber adjacent the light source so that the fluid passes close to the light source and has a relatively increased duration in the treatment zone in order to egress from the outlet. The purifying system also includes a first sensor coupled to at least one of the housing or light source for generating a first signal indicative of a first parameter of the treatment zone. Still further, the purifying system also includes a microcontroller for receiving the first signal and controlling operation of the light source. The microcontroller includes memory storing an instruction set and first data related to characterization of the light source assembly including magnitude of change in UV output across a power range and corresponding response times. The microcontroller also includes a processor for running the instruction set. The processor is in communication with the memory, wherein the processor is operative to: control the light source based on the first signal and the first data; and vary operation of the light source and collect data to create the first data related to characterization. The first parameter may be selected from the group consisting of: a temperature of the fluid in the treatment zone; a temperature of the light source; a UV output; a flow of the fluid in the treatment zone; a light source arc current; a light source voltage; and a light source response time.

It should be appreciated that the subject technology can be implemented and utilized in numerous ways, including without limitation as a process, an apparatus, a system, a device, a method for applications now known and later developed or a computer readable medium. These and other unique features of the system disclosed herein will become more readily apparent from the following description and the accompanying drawings.

BRIEF DESCRIPTION OF THE DRAWINGS

So that those having ordinary skill in the art to which the disclosed system appertains will more readily understand how to make and use the same, reference may be had to the following drawings.

FIG. 5 is a cross-sectional view of a UV Chamber with an improved outlet port in accordance with the subject technology.

FIG. 6 is a cross-sectional view of a prior art UV Chamber in accordance with the subject technology.

DETAILED DESCRIPTION OF PREFERRED EMBODIMENTS

Figure 1:
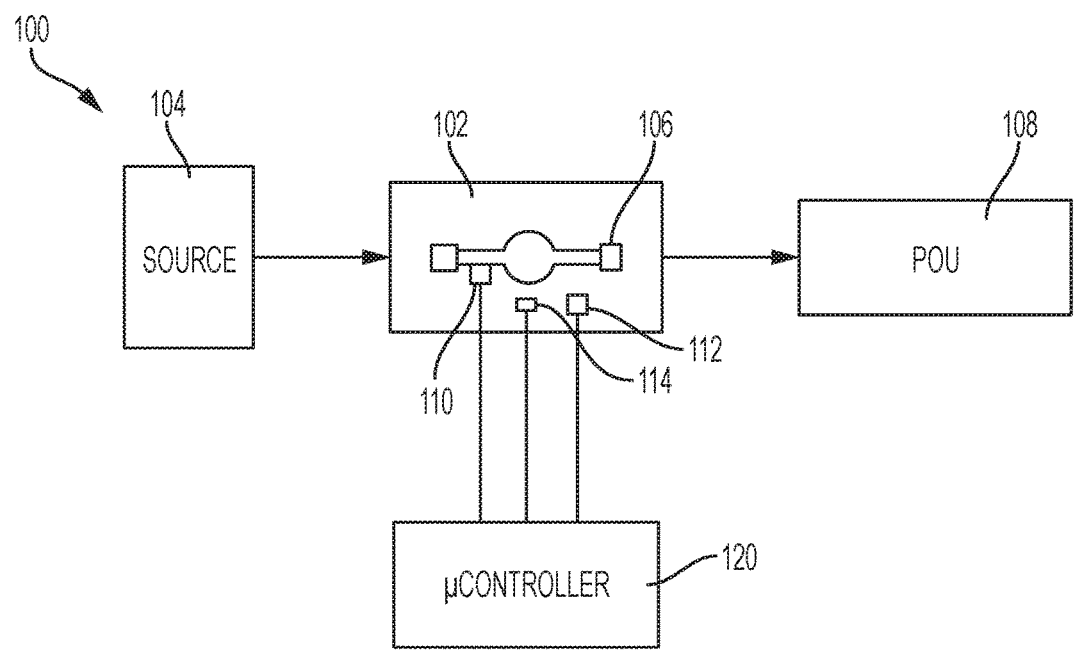
FIG. 1 is a diagram showing a UV fluid sanitizing arrangement in accordance with the subject disclosure.

The subject technology overcomes many of the prior art problems associated with UV sanitizing assemblies and methods for operating the same. The advantages, and other features of the systems and methods disclosed herein, will become more readily apparent to those having ordinary skill in the art from the following detailed description of certain preferred embodiments taken in conjunction with the drawings which set forth representative embodiments of the present invention and wherein like reference numerals identify similar structural elements. All relative descriptions herein such as left, right, up, and down are with reference to the Figures, and not meant in a limiting sense.

Referring now to FIG. 1, a diagram showing water purifying system 100 deploying an ultraviolet (UV) lamp assembly 102 in accordance with the subject disclosure is shown. The water purifying system 100 efficiently treats water with UV radiation to kill organisms among other benefits. The following discussion generally describes an overall structure of such a water purifying system 100 in a schematic fashion but further discussion of the processes, applications, programs and data that embody the methodology of the present disclosure is described elsewhere herein.

The water purifying system 100 includes a source 102 for providing a fluid to the lamp assembly 102. In this example, the fluid is water but any gas or liquid system that could benefit from UV inactivation may utilize the subject technology. The lamp assembly 102 has one or more UV lamps 106. The subject technology applies equally to any type of source 102 whether the source 102 is a single lamp in a flow tube or a rack of lamps installed in a large open channel etc. In the shown embodiment, there is one UV lamp 106 illustrated for simplicity. It is envisioned that the water flow adjacent to or even around the UV lamp 106 as is well known in the art. Once the water is treated by exposure to UV from the UV lamp 106, the water passes to a point of use (POU) 108 such as a faucet.

The lamp assembly 102 also includes one or more sensors embedded in the lamp assembly 102. The at least one sensor may determine, but is not limited to, the following: temperature of the fluid in the treatment zone; temperature of the lamp; a short wave UV (UVC) sensor signal; flow; lamp arc current, lamp arc voltage; and lamp arc time. For simplicity in FIG. 1, only a lamp temperature sensor 110, a water flow sensor 112 and a lamp UV output sensor 114 are shown. In one embodiment, the temperature sensors, such as for the lamp or the water, are thermocouples with wireless communication, such as low power radio-frequency identification (RFID), to transmit temperature data back to the microcontroller 120. In still another embodiment, the lamp temperature sensor 110 directly monitors the lamp temperature by using an infra-red (IR) transducer.

The sensors 110, 112, 114 are in communication with a microcontroller 120. The microcontroller 120 may also be in communication with a plurality of other sensors and able to communicate with various networks. Communication between the microcontroller 120 and sensors 110, 112 may be wired or wireless as is well known. The microcontroller 120 can even communicate with other devices such as a cell phone or personal computer (not shown) for remote control or monitoring.

Figure 2:
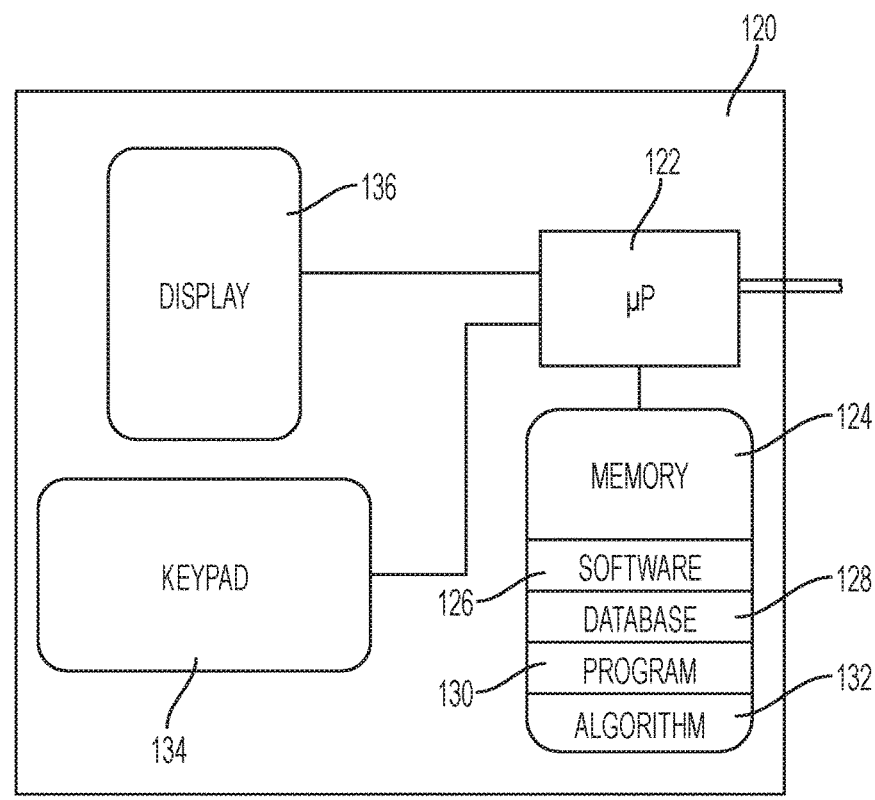
FIG. 2 is a block diagram of a microcontroller for the UV fluid sanitizing arrangement implemented in accordance with the subject disclosure.

Referring now to FIG. 2, a somewhat schematic block diagram of the microcontroller 120 implemented in accordance with the subject disclosure is shown. The microcontroller 120 includes one or more digital data processing devices particularly suited to work in various embodiments of the subject disclosure. The microcontroller 120 preferably includes a printed circuit board with components for receiving, processing, displaying, and/or transmitting digital and/or analog data.

The microcontroller 120 includes a processor 122, which is generally logic circuitry that responds to and processes instructions. The processor 122 can include, without limitation, a central processing unit, an arithmetic logic unit, an application specific integrated circuit, a task engine, and/or any combinations, arrangements, or multiples thereof. The processor 122 is in communication with memory 124. Typical memory 124 includes random access memory (RAM), read only memory (ROM), mechanisms and structures for performing 1/0 operations, and a storage medium such as a magnetic hard disk drive(s). The memory 124 includes software 126 and a plurality of modules 128, 130, 132 as needed to perform the functions of the subject technology.

For example, the software 126 may include an operating system for execution on the processor 122. Software or code generally refers to computer instructions which, when executed on one or more digital data processing devices, cause interactions with operating parameters, sequence data/parameters, database entries, network connection parameters/data, variables, constants, software libraries, and/or any other elements needed for the proper execution of the instructions, within an execution environment in memory.

The memory 124 also has plurality of modules. A module is a functional aspect, which may include software and/or hardware. Typically, a module encompasses the necessary components to accomplish a task. It is envisioned that the same hardware (e.g., memory and processor) could implement a plurality of modules and portions of such hardware being available as needed to accomplish the task.

For example, a database module 128 creates, stores and maintains multiple databases necessary for the proper operation of the subject technology. A program module 130 storm an instruction set to allow the operator to program operation of the microcontroller 120. An algorithm module 132 stores an instruction set to allow the processor to apply one or more algorithms to operation of the microcontroller 120 as well as vary the actual algorithms according to user input.

The microcontroller 120 also has input and output devices such as a keypad 134 and display 136, respectively. The keypad 134 may have any number of buttons, dials, selector switches and the like as necessary to accomplish operation in accordance with the subject technology. Similarly, the display 136 may have a plurality of different screens. Each screen may have areas that display various information as icons, graphics, numbs, letters, etc. as necessary to accomplish operation in accordance with the subject technology. In another embodiment, the display 136 includes a touchscreen that presents the keypad 134 and other interactive buttons.

Still referring to FIG. 2, the microcontroller 120 also includes a WiFi module and/or wired communication channels to facilitate communication with external sensors, networks, devices, elements and the like. Those of ordinary skill will recognize that the hardware, software, modules, sensors, elements, devices and various processes discussed herein are merely exemplary of the structure and functionality performed by the disclosed technology and thus such hardware and processes (and/or their equivalents) may be implemented in commercial embodiments in various combinations without materially affecting the operation of the disclosed technology. It is also envisioned that the microcontroller 120 and/or other components may be incorporated into a more comprehensive site controller that controls the operation of additional systems (e.g., heating and air conditioning) along with additional sensors and the like.

In brief overview, the disclosed technology relates to improving the efficiency of UV treatment of fluids. One aspect of the subject technology is improved operation of the UV source based upon characterization of the UV source for various parameters. As a result of the compensating operation based on the characterization of the UV source, the UV source performs more efficiently. Further, as noted below with respect to FIG. 5, various features can be incorporated into the UV source to further enhance the performance thereof.

Figure 3:
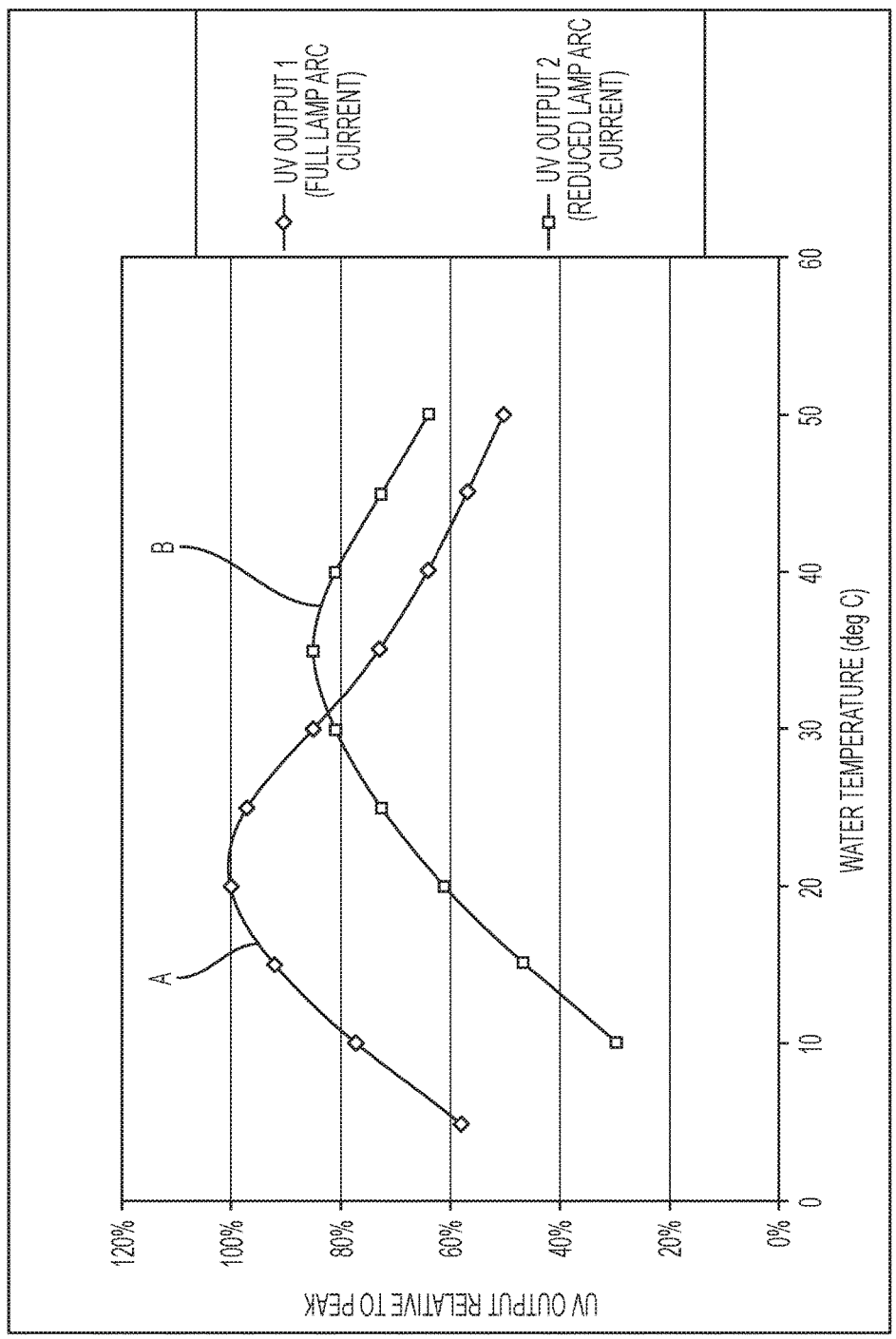
FIG. 3 is a graph of UVC output vs. Fluid Temperature in accordance with the subject technology.

Referring now to FIG. 3, a graph of UVC output vs. Fluid Temperature is shown, wherein the fluid temperature is that of the fluid being treated. On the graph are two curves as follows: Curve A is a full lamp arc current; and Curve B is a reduced arc lamp current. In other words, Curves A and B are for the same lamp at different arc currents. By comparing Curve A at high arc current with curve B at reduced arc current, it is seen that the optimum operating point does not occur at a constant temperature. Further, it will be recognized by those skilled in the art that increasing lamp current may increase or decrease the UVC output, and that the optimum arc current value is not a constant but depends at least partly on the surrounding fluid temperature. In view of Curves A and B of FIG. 3, a process for adjusting energy input to the lamp to determine whether it is necessary to increase or decrease energy input to the lamp has been developed.

The following flow chart herein illustrate the structure or the logic of the present technology, possibly as embodied in program software for execution on the processor 122 of the microcontroller 120. Those skilled in the art will appreciate that the flow charts illustrate the structures of the program software or code elements, which may include logic circuits on an integrated circuit, that function according to the present technology. As such, the present technology may be practiced by a machine component that renders the program software in a form that instructs a processor to perform a sequence of function steps corresponding to those shown in the flow charts and equivalents.

Figure 4:
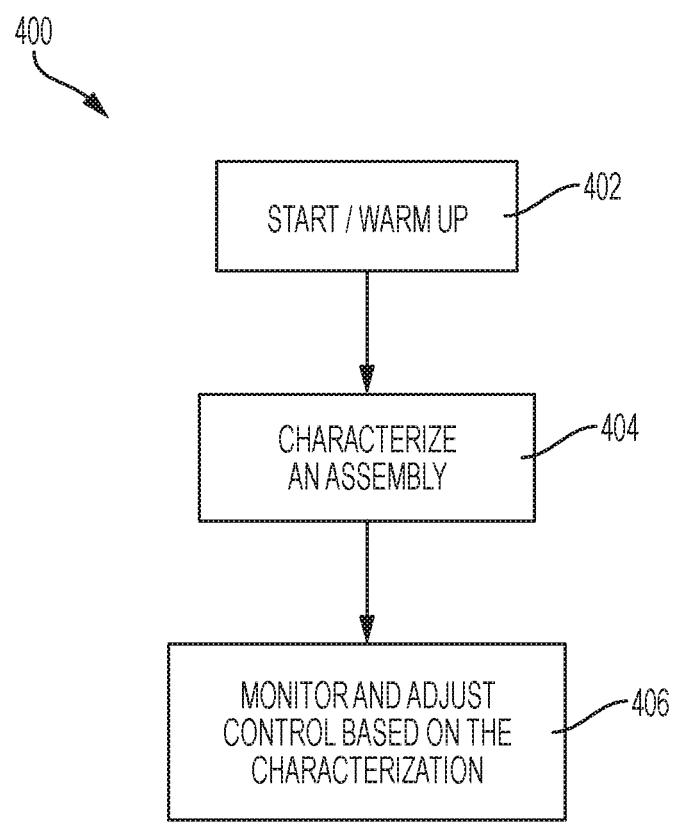
FIG. 4 illustrates a process for adjusting energy input to a lamp in accordance with the subject technology.

Referring now to FIG. 4, there is illustrated a flowchart depicting a process 400 for controlling a UV lamp in accordance with the subject technology. It is envisioned that the keypad 134 of the microcontroller 120 is utilized by an operator to enter the information as needed. The process 400 maintains the UVC output efficiency near the optimum for any particular combination of electrical energy input and fluid temperature, thereby minimizing wasted energy and undesirable fluid heating. A preferred embodiment of the process 400 is utilizes a signal from the UV output sensor 114 which senses the UV output from the lamp, for example, as shown and described above with respect to FIGS. 1 and 2.

At step 402 of the process 400, the UV lamp is started and monitored for an initial warm-up phase during which full power is applied to the lamp. Once the UV output peaks and then starts to decline, the microcontroller 120 recognizes that full warm-up has been achieved and, in turn, reduces the electrical energy to the UV lamp 106.

At step 404, the microcontroller 120 performs a characterization routine to determine the performance characteristics of the lamp assembly 102. The performance characteristics can relate to adjustment of one or more parameters and the corresponding changes in performance. Preferably, the characterization includes determining the magnitude or amount of change in parameters as well as the time required for such changes to occur. As a result of the characterization, operation of the lamp assembly 102 may be modified to improve performance and efficiency.

In one embodiment, at step 404, the microcontroller 120 monitors changes in the lamp's UV output and the rate of change of UV output in response to change in are current. If a decrease in are current results in an increase of UV output, then the arc current is reduced further. If the decrease in arc current causes a decrease in UV output, then the lamp arc current is increased. The changes can be for a predetermined range, or stopped when a preset threshold is reached, or reviewed by an operator and the like to determine when to stop the characterization routine. In short, for this example, the response time and magnitude of change for certain energy changes are determined for the lamp assembly 102.

At step 406, the microcontroller 120 uses the characterization information to enhance the efficiency and performance of the lamp assembly 102. For example, when additional UV output is desirable, the rate of change in the UV output is used to determine the magnitude of change in electrical energy. Further, the response time for subsequently adjusting the energy input is also known and utilized in calculating the adjustment. For example, the slower the rate of change in UV output, the slower the changes in electrical energy input in order to prevent overshoot of the target. In this manner, the UV power setting is automatically set to the optimum level for the fluid treatment system's current conditions. To continue with an example, if the water in the treatment zone is stagnant, the microcontroller 120 will gradually reduce power input to the lamp as the water warms up, thereby reducing the overall undesired heating of the water. In short, the microcontroller 120 either increases or decreases the electrical energy input to the lamp in response to at least one sensor input to optimize the UV output for a particular power setting.

Another embodiment of the subject technology utilizes the coupling fluid temperature with the UV output. The microcontroller 120 could then include logical operations based on change and rate of change of UV output and fluid temperature parameters. The microcontroller 120 can also use fuzzy logic and Proportional Integral Derivative (PID) control loops to teach the algorithm when and how fast to make adjustments to the electrical energy input, thereby allowing for more precise achievement of optimum lamp operation.

Still another embodiment of the present technology involves the coupling of two or more signals, such as UV output and fluid temperature. During the "learning phase" where characterization of the system occurs, optimum UV output is maintained in a multitude of operating environments. Once the learning phase is complete, the microcontroller 120 will be able to make tuned adjustments with just one signal, such as fluid temperature, thereby allowing a lower cost system to be produced commercially while retaining the benefits of characterization based on multiple parameters. For example, the microcontroller 120 can assume that each commercial system behaves similar to the characterization system so that adjustments based on UV output only can be made and corresponding calculations regarding how the water temperature changes. These calculated changes to the water temperature can be then also be used in determining how the power to the UV lamp assembly 102 is controlled.

Turning now to structural features that improve the performance of a UV source, FIG. 5 illustrates a UV source 200 in accordance with the subject technology. The UV source 200 is similar to the UV source 300 described in connection with FIG. 6, thus similar elements are indicated with the like reference numbers. Many elements are essentially the same as those of the foregoing and, thus, are not further described herein. The primary difference between the UV source 200 and the prior art UV source 300 is the addition of several features to increase the dosage.

One of the features to increase the dosage is a modified outlet port 210. The outlet port 210 includes a frame or extension 230 that extends radially inward towards the UV source 214. The inward port extension 230 disrupts and/or slows down the flowpath indicated by arrows 212 as shown in FIG. 5. Without being limited to any particular theory, the inward port extension 230 forces fluid elements closer to the UV source 214 that those fluid elements pass through a region of greater UV intensity. The inward port extension 230 also causes such fluid elements to experience a longer duration period within the treatment zone 202. In other words, the inward port extension 230 slow down flow particularly in the area 238 approaching the outlet port 210. Consequently, the fluid elements have a higher accumulated UV dose (e.g., increased intensity and increased time=increased dose) compared to those following of FIG. 6. In one embodiment, the outlet port 210 has a tube inserted therein to form the extension 230. As such, the extension 232 would be a tubular flange around the outlet port 210.

Similarly, an inward port extension 232 can be included on the inlet port 208. Still further, other inward features 234, like an inward sloping bump in the treatment zone 202, can be used to increase the duration and/or intensity of exposure in the treatment zone. It is envisioned that such elements 230, 232, 234 and the like may be used individually or in various combinations. In one embodiment, a tube is inserted in the inlet port 208 to form the extension 232. Additional features for increasing the dosage may include, without limitation, an annular ridge on the inner diameter of the tubular housing that is rectangular, trapezoidal, square, triangular etc. in cross-section. It is also envisioned that the UV lamp source 214 is relatively shorter so that one or more of the inward features 230, 232, 234 only functions to increase duration of the fluid but does not impact relative closeness to the UV lamp source 214.

By minimizing the production of low dose fluid elements using one or more of the elements 230, 232, 234, it has been demonstrated by proven computational fluid dynamics and numerical methods to increase disinfection efficacy of the UV treatment zone 202 by 15% as measured by net log reduction of virtual microorganisms, using the same energy input. This increased efficiency has been shown to be more pronounced with relatively short chambers and/or chambers with relatively large diameters, therefore another benefit of the present invention is to enable more effective compact UV treatment chambers.

It will be appreciated by those of ordinary skill in the pertinent art that the functions of several elements may, in alternative embodiments, be carried out by fewer elements, or a single element. Similarly, in some embodiments, any functional element may perform fewer, or different, operations than those described with respect to the illustrated embodiment. Also, functional elements (e.g., modules, databases, interfaces, computers, servers and the like) shown as distinct for purposes of illustration may be incorporated within other functional elements in a particular implementation.

INCORPORATION BY REFERENCE

All patents, patent applications and other references disclosed herein are hereby expressly incorporated in their entireties by reference.

While the subject technology has been described with respect to preferred embodiments, those skilled in the art will readily appreciate that various changes and/or modifications can be made to the subject technology without departing from the spirit or scope of the invention as defined by the appended claims.

What is claimed is:

1. A fluid purifying system for treating a fluid with UV light comprising:
 a housing defining: a chamber having a treatment zone; an inlet; and an outlet so that the fluid entering the inlet passes through the treatment zone and exits through the outlet;
 a light source mounted in the chamber for supplying UV light output to the treatment zone, wherein at least one of the inlet, the housing, or the outlet extends radially inward into the chamber adjacent the light source so that the fluid passes close to the light source and has a relatively increased duration in the treatment zone in order to egress from the outlet;
 a first sensor coupled to at least one of the housing or light source for generating a first signal indicative of a first parameter of the treatment zone; and
 a microcontroller for receiving the first signal and controlling operation of the light source, the microcontroller including: memory storing an instruction set and first data related to characterization of the light source including magnitude of change in the UV light output across a power range and corresponding response times; and a processor for running the instruction set, the processor being in communication with the memory, wherein the processor is operative to: control the light source based on the first signal and the first data; and vary operation of the light source and empirically collect data to create the first data related to characterization so that during operation when additional UV light output is required, a rate of change in the UV light output is used to determine a magnitude of power to the light source.

2. A fluid purifying system as recited in claim 1, wherein the first parameter is selected from the group consisting of: a temperature of the fluid in the treatment zone; a temperature of the light source; a UV output; a flow of the fluid in the treatment zone; a light source arc current; a light source voltage; and a light source response time.

3. A fluid purifying system as recited in claim 1, wherein the first parameter is at least two parameters selected from the group consisting of: a temperature of the fluid in the treatment zone; a temperature of the light source; a UV output; a flow of the fluid in the treatment zone; a light source arc current; a light source voltage; and a light source response time.

4. A fluid purifying system comprising:
 a) a light source assembly including:
  i) a housing defining: a chamber having a treatment zone; an inlet; and an outlet so that the fluid entering the inlet passes through the treatment zone and exits through the outlet;
  ii) a light source mounted in the chamber for supplying UV light to the treatment zone, wherein the fluid in the treatment zone at least partially surrounds the light source; and
  iii) a first sensor for generating a first signal indicative of a temperature of the fluid in the treatment zone; and
 b) a microcontroller for receiving the first signal and controlling operation of the light source, the microcontroller including:
  i) memory storing an instruction set and first data related to characterization of the light source assembly for different temperatures of the fluid in the treatment zone versus UV light output of the light source at varying current levels; and
  ii) a processor for running the instruction set, the processor being in communication with the memory, wherein the processor is operative to control the light source based on the first signal and the first data so that during operation an optimum current level is chosen based upon the temperature of the fluid in the treatment zone.

5. A fluid purifying system as recited in claim 4, wherein the processor is operative to vary operation of the light source and collect data to create the first data related to characterization.

6. A fluid purifying system as recited in claim 4, wherein the first data includes magnitude of change in UV output across a range of powers and corresponding response times.

7. A fluid purifying system as recited in claim 4, wherein the first parameter is selected from the group consisting of: a temperature of the fluid in the treatment zone; a temperature of the light source; a UV output; a flow of the fluid in the treatment zone; a light source arc current; a light source voltage; and a light source response time.

8. A fluid purifying system as recited in claim 4, wherein the first sensor is an infra-red sensor.

9. A fluid purifying system as recited in claim 4, wherein the first sensor monitors a temperature of liquid mercury droplets in the light source.

10. A fluid purifying system for treating a fluid with UV light comprising:
 a housing defining: a chamber having a treatment zone; an inlet; and an outlet so that the fluid entering the inlet passes through the treatment zone and exits through the outlet; and
 a light source mounted in the chamber for supplying UV light to the treatment zone;
 a first sensor coupled to at least one of the housing or light source for generating a first signal indicative of a first parameter of the treatment zone, wherein the first sensor monitors a temperature of liquid mercury droplets in the light source; and
 a microcontroller for receiving the first signal and controlling operation of the light source based upon the first signal to optimize efficiency.

11. A fluid purifying system as recited in claim 10, wherein the first signal indicates a temperature of the fluid.

12. A fluid purifying system as recited in claim 10, the microcontroller includes: memory storing an instruction set and first data related to characterization of the light source including magnitude of change in UV output across a power range and corresponding response times; and a processor for running the instruction set, the processor being in communication with the memory, wherein the processor is operative to: control the light source based on the first signal and the first data.

13. A fluid purifying system as recited in claim 12, wherein the processor is operative to vary operation of the light source.

14. A fluid purifying system as recited in claim 10, further comprising:
 a housing defining: a chamber having a treatment zone; an inlet; and an outlet so that the fluid entering the inlet passes through the treatment zone and exits through the outlet;
 a light source mounted in the chamber for supplying UV light to the treatment zone, wherein at least one of the inlet, the housing, or the outlet extends radially inward into the chamber;
 wherein:
 at least one of the inlet, the housing, or the outlet extends radially inward adjacent the light source so that the fluid passes close to the light source in order to egress from the outlet;
 at least one of the inlet, the housing, or the outlet extends radially inward so that the fluid has a relatively increased duration in the treatment zone before egress from the outlet; and
 the outlet includes a tube inserted therein to form a tubular flange extending into the chamber.

* * * * *